US012138497B2

(12) United States Patent
Foreman

(10) Patent No.: US 12,138,497 B2
(45) Date of Patent: Nov. 12, 2024

(54) BELT HAVING A RETRACTING LANYARD

(71) Applicant: James Frederick Foreman, Chesapeake, VA (US)

(72) Inventor: James Frederick Foreman, Chesapeake, VA (US)

( * ) Notice: Subject to any disclaimer, the term of this patent is extended or adjusted under 35 U.S.C. 154(b) by 117 days.

(21) Appl. No.: 18/155,155

(22) Filed: Jan. 17, 2023

(65) Prior Publication Data

US 2023/0149751 A1 May 18, 2023

Related U.S. Application Data

(63) Continuation-in-part of application No. 13/753,473, filed on Jan. 29, 2013.

(60) Provisional application No. 61/593,205, filed on Jan. 31, 2012.

(51) Int. Cl.
*A62B 35/00* (2006.01)

(52) U.S. Cl.
CPC ................................ *A62B 35/0075* (2013.01)

(58) Field of Classification Search
CPC ............ A62B 35/0075; A62B 35/0043; A62B 35/0037; A62B 35/0068
See application file for complete search history.

(56) References Cited

U.S. PATENT DOCUMENTS 785,662 A 3/1905 Chapman
2,025,886 A 12/1935 Nordstrom
2,048,498 A 7/1936 Foster
2,156,373 A 5/1939 Craighead
2,342,066 A 2/1944 Tramill
2,503,157 A 4/1950 Knee
2,994,300 A * 8/1961 Grahling .............. A01K 27/005 119/770
3,004,519 A 10/1961 Weissman
3,941,208 A 3/1976 St. Germain
4,062,066 A 12/1977 Weiss
4,121,688 A 10/1978 Lirakis
4,253,544 A * 3/1981 Dalmaso ................ A62B 35/04 182/18
4,446,574 A 5/1984 Kalomeris
4,525,879 A 7/1985 Kalomeris
4,714,135 A * 12/1987 Bell ................... A62B 35/0025 182/6
4,923,048 A * 5/1990 Cole ...................... A62B 35/04 182/9
5,233,942 A 8/1993 Cooper
5,332,071 A * 7/1994 Duncan ............... E04G 21/3295 267/74
5,367,714 A 11/1994 Hines
5,806,087 A 9/1998 Grotefend
5,839,932 A 11/1998 Pierce
5,970,517 A 10/1999 Jordan
5,983,403 A 11/1999 Neeley
6,067,661 A 5/2000 Bates
6,134,713 A 10/2000 De Rosa
6,299,040 B1 * 10/2001 Matias ............... A62B 35/0075 224/254
6,339,848 B1 1/2002 Mayhood
(Continued)

*Primary Examiner* — Alissa L Hoey
(74) *Attorney, Agent, or Firm* — Dinsmore & Shohl LLP

(57) ABSTRACT

A belt for securing a user to an object includes a belt body, an elastic bungee detachably secured to the belt, a lanyard that is connected to the bungee and a stop block having a lanyard slot through which the lanyard body passes.

9 Claims, 8 Drawing Sheets

(56) References Cited

U.S. PATENT DOCUMENTS

| | | | | |
|---|---|---|---|---|
| 6,481,382 | B2 | 11/2002 | Cohn | |
| 6,487,725 | B1 | 12/2002 | Jordan | |
| 6,648,101 | B2 * | 11/2003 | Kurtgis | A62B 35/0075 182/7 |
| 6,702,328 | B2 * | 3/2004 | Malleis | A63C 11/00 280/809 |
| 6,732,834 | B2 | 5/2004 | Colorado | |
| 6,776,317 | B1 * | 8/2004 | Parker | A45F 5/00 224/904 |
| 6,800,007 | B2 | 10/2004 | Calkin | |
| 7,073,462 | B1 | 7/2006 | Layman | |
| 7,357,284 | B2 | 4/2008 | Jauvin | |
| 7,458,135 | B2 * | 12/2008 | Mikesell | B25H 3/006 24/301 |
| 7,856,672 | B1 * | 12/2010 | Koehler | F41B 13/06 2/312 |
| 8,474,414 | B2 | 7/2013 | Dagnon | |
| 8,919,293 | B2 | 12/2014 | Cromwell | |
| 9,873,005 | B1 * | 1/2018 | Williams | A45F 3/14 |
| 10,343,001 | B2 * | 7/2019 | Seman | A62B 35/0075 |
| 10,716,390 | B2 * | 7/2020 | Wagner | A45F 5/00 |
| 10,782,093 | B2 * | 9/2020 | Dilling | F41C 33/002 |
| 11,198,027 | B2 * | 12/2021 | Green Mullins | A62B 35/0075 |
| 11,235,185 | B1 * | 2/2022 | Truesdell | A62B 35/0075 |
| 11,499,604 | B2 * | 11/2022 | Wagner | F16G 11/00 |
| 11,510,482 | B2 * | 11/2022 | Holland | A45F 5/00 |
| 11,690,356 | B2 * | 7/2023 | Kirkham | A01K 27/004 119/793 |
| 2002/0029407 | A1 | 3/2002 | Blechman | |
| 2003/0042348 | A1 | 3/2003 | Salentine | |
| 2003/0121946 | A1 | 7/2003 | Tai | |
| 2003/0182715 | A1 | 10/2003 | Wallace | |
| 2004/0154556 | A1 | 8/2004 | Masterson | |
| 2006/0137625 | A1 | 6/2006 | Conte | |
| 2006/0272890 | A1 * | 12/2006 | Harmon | A45F 5/021 182/3 |
| 2007/0199767 | A1 | 8/2007 | Altieri | |
| 2008/0072846 | A1 | 3/2008 | Albright | |
| 2009/0127302 | A1 * | 5/2009 | Pruitt | B25B 23/00 224/219 |
| 2009/0294495 | A1 | 12/2009 | Moreau | |
| 2010/0147912 | A1 * | 6/2010 | Salentine | A45F 5/02 224/254 |
| 2010/0193288 | A1 | 8/2010 | Colorado | |
| 2010/0235968 | A1 | 9/2010 | Lee | |
| 2011/0103558 | A1 * | 5/2011 | Hooten | A62B 35/04 379/37 |
| 2011/0284322 | A1 | 11/2011 | West | |
| 2011/0308480 | A1 | 12/2011 | Mendizabal | |
| 2012/0159694 | A1 | 6/2012 | Ploughman | |
| 2012/0267403 | A1 * | 10/2012 | Ward, Jr. | A45F 5/00 224/219 |
| 2013/0191970 | A1 | 8/2013 | Foreman | |
| 2016/0227911 | A1 * | 8/2016 | Benzakin | A45F 5/00 |
| 2019/0250053 | A1 * | 8/2019 | Moreau | G01L 5/047 |
| 2019/0328121 | A1 * | 10/2019 | Lundstedt, Jr. | A45F 5/021 |
| 2021/0346739 | A1 * | 11/2021 | Shaver | A62B 35/04 |
| 2022/0134447 | A1 * | 5/2022 | Hahn | A45F 5/00 24/298 |
| 2023/0026773 | A1 * | 1/2023 | Wang | A62B 35/0018 |

* cited by examiner

BELT HAVING A RETRACTING LANYARD

BACKGROUND OF THE INVENTION

Field of the Invention

The present invention relates to belts and, more particularly, to a belt that has a retracting lanyard built into it and a hidden pocket. The invention utilizes a stop system that limits lanyard travel and thus secures the user to an immobile object with a predetermined length tether.

Description of the Related Art

For linemen, climbers, firemen, handymen, military personnel and the like, a strong belt and a lanyard are combined to create a system to hold the 15 wearer to an object in case of a fall. These conventional items, however, are bulky and inefficient and can get caught up easily. Many times, these conventional lanyards are taken off the belt to keep from getting tangled when it's not in use. Then, when it is needed, the lanyard needs to be retrieved and reattached to the belt.

As can be seen, there is a need for a belt having a retractable lanyard and can be removed for use and stored within the belt when not in use.

SUMMARY OF THE INVENTION

In one aspect of the present invention, a belt comprises a belt body having a first end and a second end; a lanyard buckle attached to the first end of the belt body; the second end of the belt body passing through the lanyard buckle and secured to form a loop of a desired size with a belt buckle; a lanyard passing through the lanyard buckle and extendable from a lanyard channel; and an attachment device disposed on an end of the lanyard.

In another aspect of the present invention, a belt comprises a belt body having a first end and a second end; a lanyard buckle attached to the first end of the belt body; the second end of the belt body passing through the lanyard buckle and secured to form a loop of a desired size with a belt buckle; a lanyard passing through the lanyard buckle and extendable from a lanyard channel; a stop disposed on the lanyard to prevent the lanyard from being removed from the belt; an attachment device disposed on an end of the lanyard; and an attachment pouch for storing the attachment device when not in use.

These and other features, aspects and advantages of the present invention will become better understood with reference to the following drawings, description and claims.

It should be appreciated that all combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWING FIGURES

In the drawings, like reference characters generally refer to the same parts throughout the different views. Also, the drawings are not necessarily to scale, emphasis instead generally being placed upon illustrating the principles of the invention.

DETAILED DESCRIPTION OF THE PREFERRED EMBODIMENT(S)

Numerous variations and modifications will be apparent to one of ordinary skill in the art, as will become apparent from the description below. Therefore, the invention is not limited to the specific implementations discussed herein.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a belt having a retracting lanyard built into it for convenient deployment of an attachment device attached to the lanyard. The lanyard can be contained within the belt when not in use and can be extended therefrom for use. A stop prevents the lanyard from being removed from the belt and, therefore, the lanyard never needs to come off the belt. Because the lanyard retracts into a channel or slot in the belt, it does not get tangled and hung up. The belt can also include a hidden pocket to store money, notes, maps and the like. The attachment device can be stored in an attachment pouch when not in use, keeping the attachment device ready for use and preventing it from getting caught when not in use.

Referring now to FIGS. 1 through 4, a belt body 10 operable to wrap around a user, such as around a user's waist. The belt body 10 can be looped through a lanyard buckle 26 disposed on a first end of the belt body 10. A second, opposite end of the belt body 10 can be passed through a belt buckle 12 to form the belt body 10 in a loop of a desired size.

Figure 1:
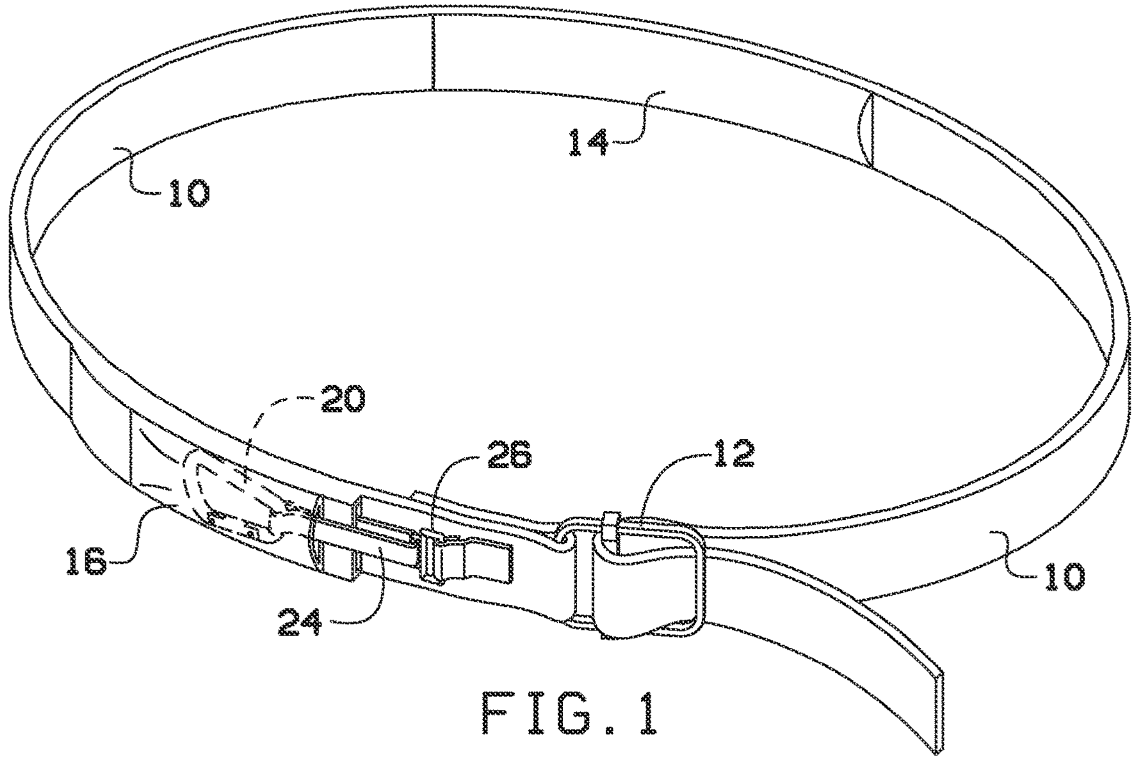
FIG. 1 is a perspective view of a belt showing an attachment device, such as a carabineer, in a stowed configuration and a lanyard in a retracted configuration.

The belt body 10 can be formed with a hidden pocket 14 formed therein. The hidden pocket 14 can be, for example, formed on an inside surface of the belt body, as shown in FIG. 1. The hidden pocket 14 can be used to store various items, such as money, notes, maps, and the like.

The belt body 10 can include a lanyard channel 18 formed therein. The lanyard channel 18 can be operable to store at least a portion of a lanyard 24 therein. The lanyard 24 can extend out of the lanyard channel 18 and pass through the lanyard buckle 26. The lanyard 24 can extend from about 6 inches to about 36 inches from the lanyard buckle 26 when in use. A stop 22 can prevent the lanyard 24 from being pulled out of and removed from the belt.

An attachment device 20, such as a carabineer, can be disposed on an end of the lanyard 24. The attachment device 20 can be stored in an attachment pouch 16 formed in the belt body 10 when not in use, as shown in FIG. 1.

Figure 2:
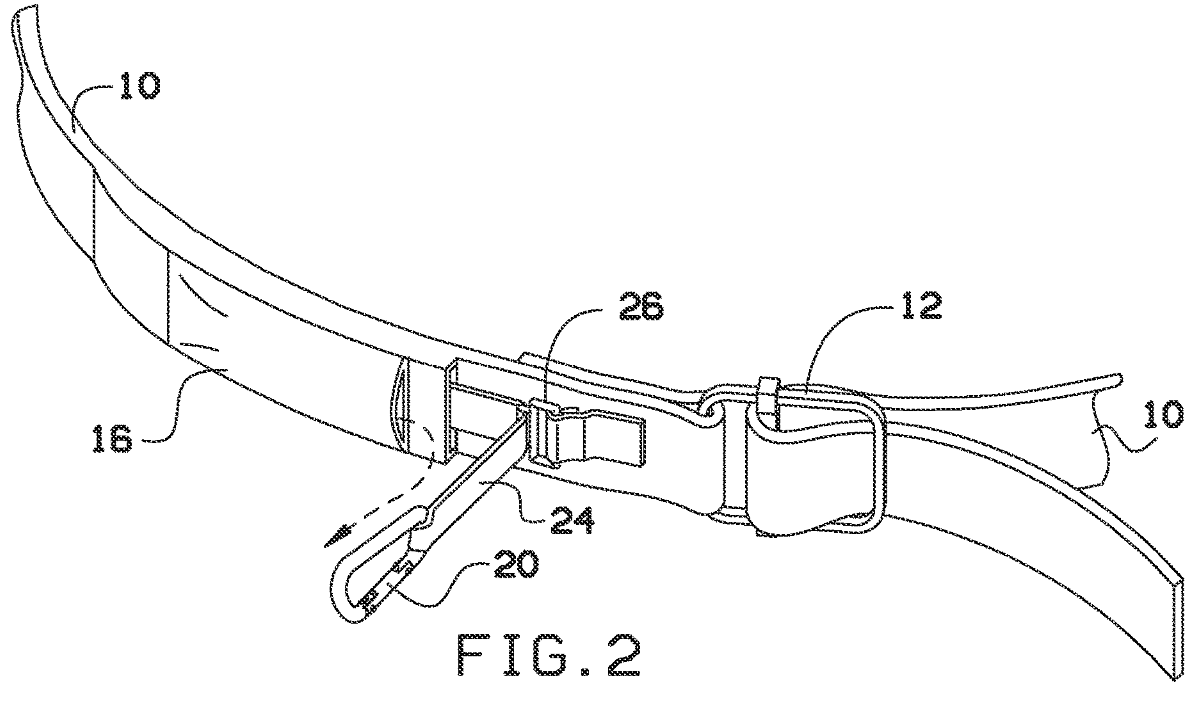
FIG. 2 is a detailed perspective view of the belt of FIG. 1 showing the attachment device in a removed configuration and the lanyard in a retracted configuration.
Figure 3:
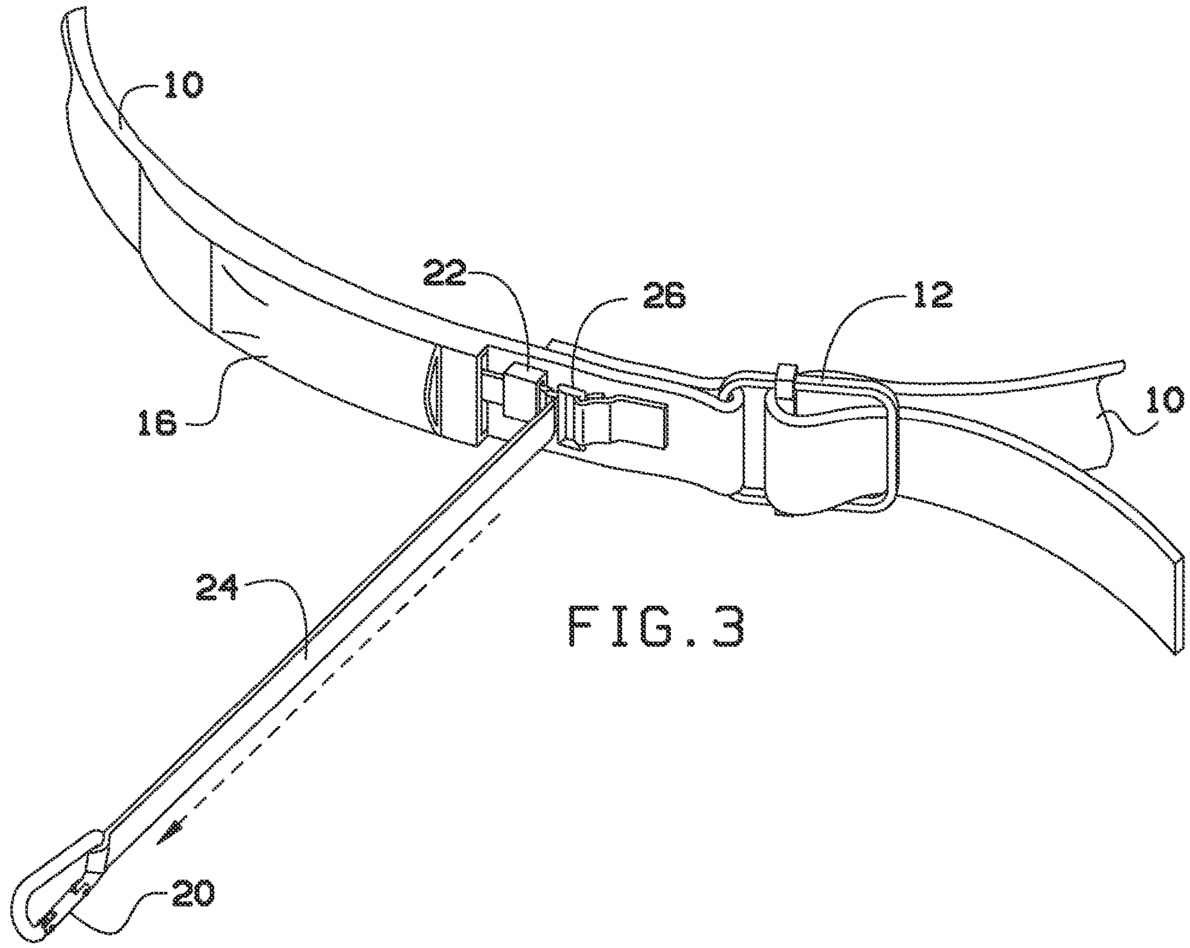
FIG. 3 is a detailed perspective view of the belt of FIG. 1 showing the attachment device in a removed configuration and the lanyard in an extended configuration, engaging a stop to prevent removal thereof.
Figure 4:
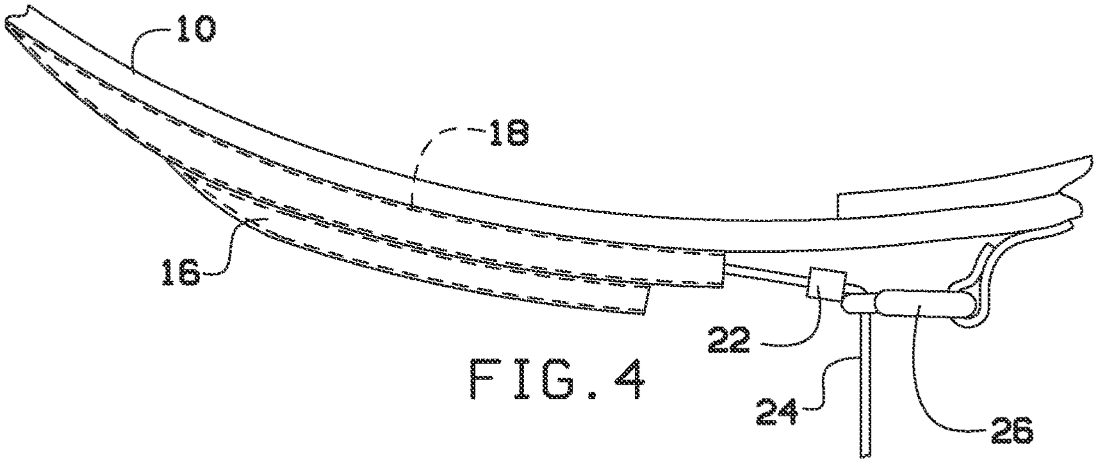
FIG. 4 is a top view of the belt of FIG. 1, illustrating engagement of the stop and an exemplary configuration of attachment device and lanyard pockets.

When a user needs to secure themselves, such as when using a ladder, working in a bucket, or the like, the user, wearing the belt, can simply remove the attachment device 20 from the attachment pouch 16, as shown in FIG. 2, and extend the lanyard 24 from the lanyard channel 18, as shown in FIG. 3. The user can then connect the attachment device 20 to an appropriate anchor (not shown), thereby securing the user. The stop 22 prevents the lanyard 24 from being removed completely from the belt. When the user no longer needs to be secured, they can simply remove the attachment device 20, stow the lanyard 24 back into the lanyard channel 18 and store the attachment device 20 into the attachment pouch 16.

The belt body 10 can be made from various flexible materials, such as leather. The lanyard 24 can be made from a strong flexible material, such as those made from an aramid fiber, such as Kevlar® fabric, for example. The buckles 12, 26 can be made from a strong, rigid material, such as steel, for example. Of course, other materials are contemplated within the scope of the present invention. It should be understood, of course, that the foregoing relates to exemplary embodiments of the invention and that modifications may be made without departing from the spirit and scope of the invention as set forth in the following claims.

Referring now to FIGS. 5-9, and in accordance with some additional embodiments and aspects, a belt 100 for securing a user 1 to an object (not shown) includes a belt body 110, the belt body 100 having a first end 112 secured to a belt buckle 120 and a free second end 114 that may be positioned around a user 1 and then looped through buckle 110 to form a belt 100. Belt body 110 may be formed of heavy webbing material, such as canvas webbing, Kevlar material, or any equivalent high tensile strength, flexible material without departing from the various embodiments described herein. While buckle 120 is depicted as a D-ring type buckle, one of ordinary skill will realize that a wide variety of buckles may be employed in the context of the embodiments described.

In various exemplary embodiments belt 100 further includes a bungee 140, made of flexible elastic material such as bungee cord or bungee rope. Bungee 140 has a predetermined length that permits it to place tension on a lanyard 160, as described further herein below. Bungee 140 includes a first end 142 having a snap or button fastener 144 that permits it to be secured to a corresponding snap or fastener 116 secured to belt body 110. Bungee 140 also includes a second end 146 that may in some embodiments terminate in a loop 148. Furthermore a bungee guide 150, similar to a belt loop, may be sewn or otherwise secured to belt body 110 such that bungee 140 may be routed through bungee guide 150 to enable bungee 140 to be held proximate belt body 140, thereby permitting it to stretch freely without becoming entangled or snarled. Fastener 144 of bungee 140 permits the bungee to be rapidly changed or switched out a bungee 140 is damaged, or if a user 1 wishes to use a bungee 140 having a higher coefficient of elasticity.

Figure 5:
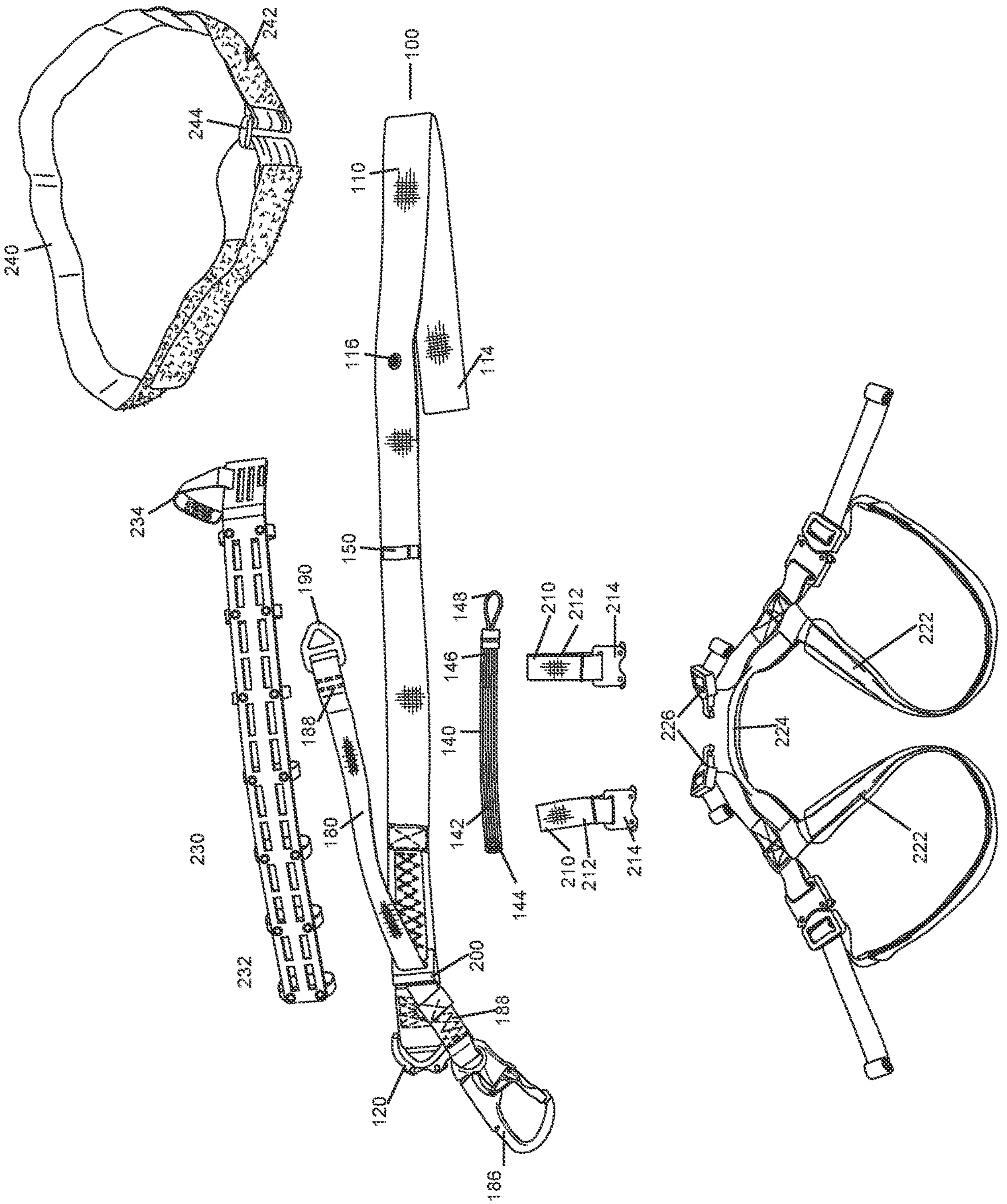
FIG. 5 is an assembly view of a belt in accordance with some embodiments.
Figure 6:
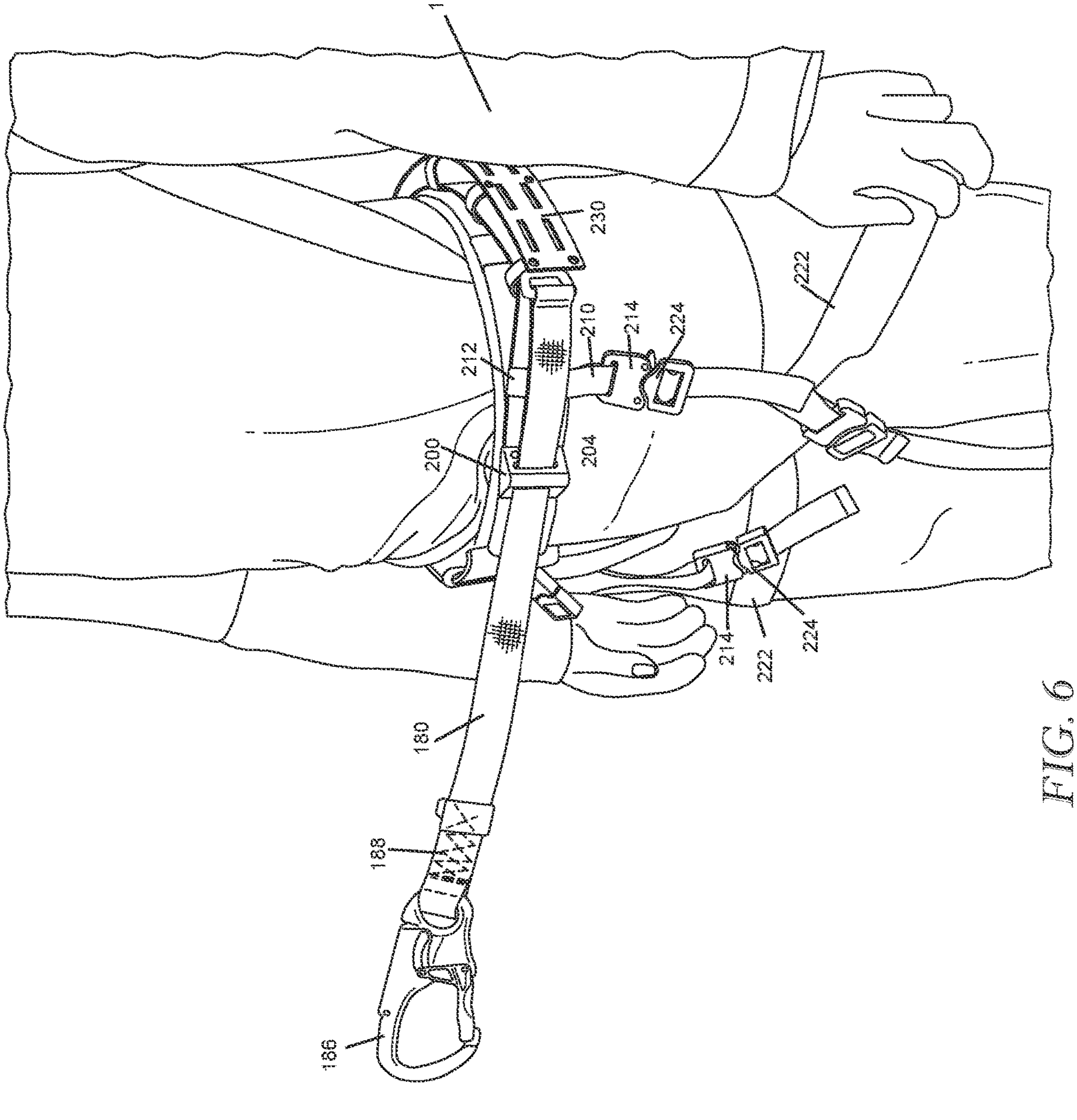
FIG. 6 is a view of an embodiment of a belt depicted on a user in accordance with some embodiments.
Figure 7A:
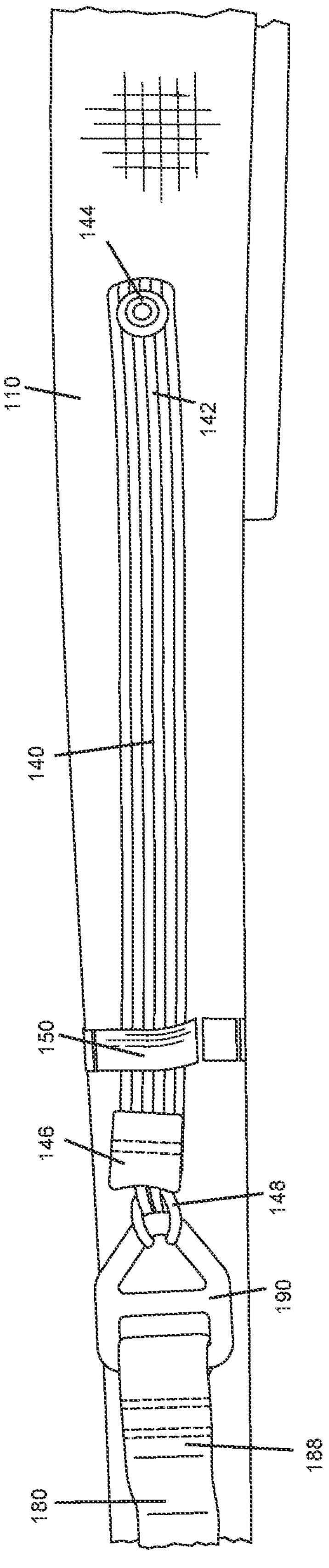
FIG. 7A is a partial view of a belt lanyard and attachment in accordance with some embodiments.
Figure 7B:
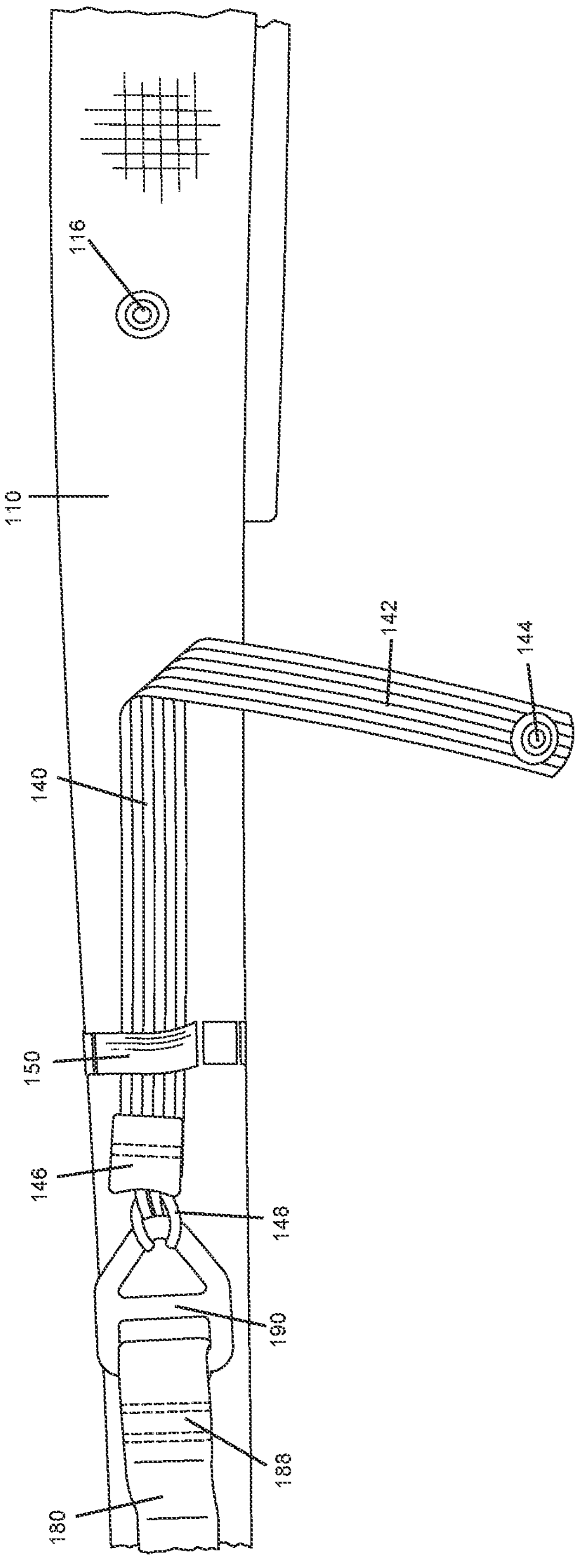
FIG. 7B is a partial view of a belt lanyard and attachment in accordance with some embodiments.
Figure 8:
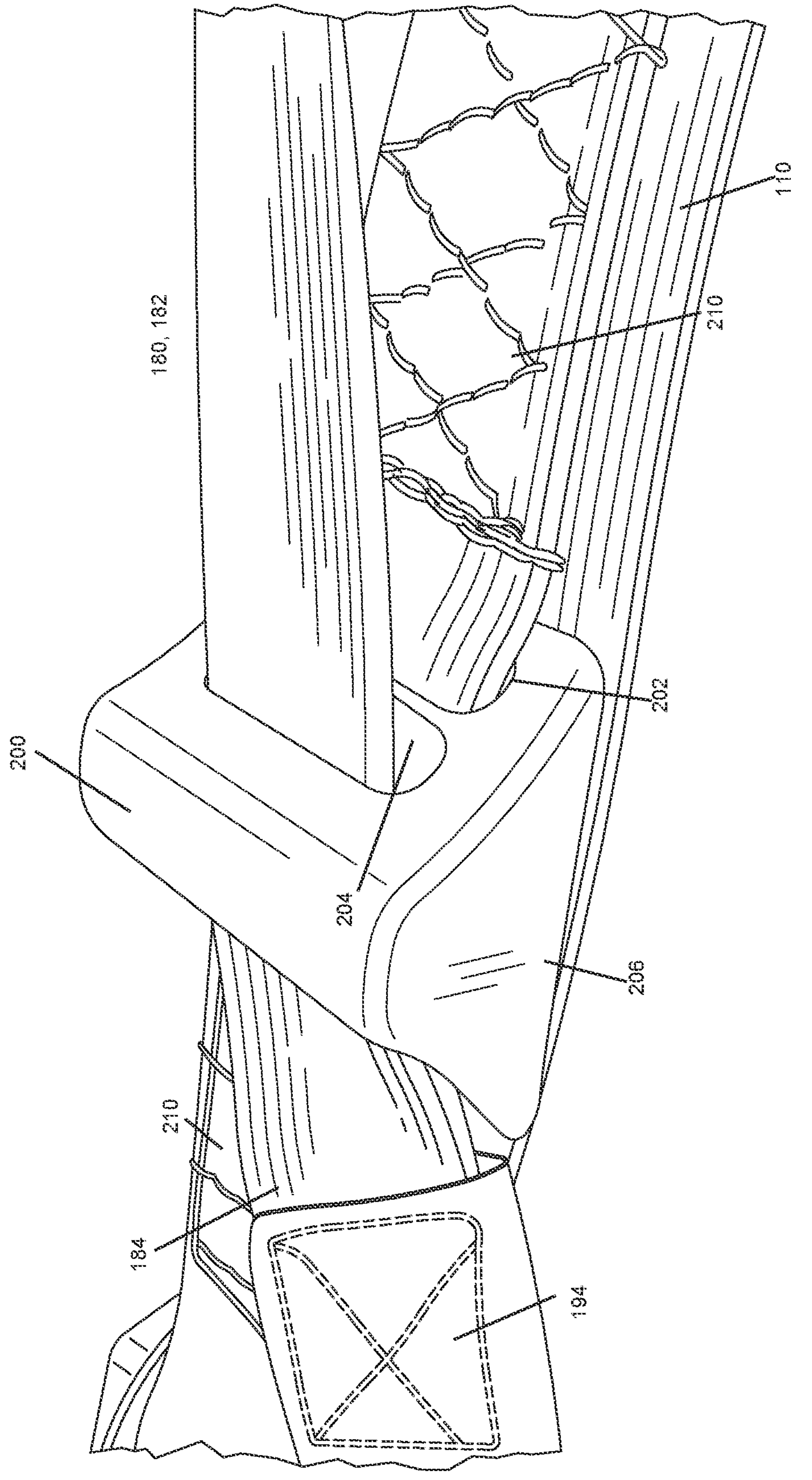
FIG. 8 is a partial view of a belt lanyard and stop block in accordance with some embodiments.

Referring now to FIGS. 5, 6, and 8 belt 100 in some embodiments further includes a lanyard 180, also made of heavy webbing material, canvas webbing, Kevlar material, or any equivalent high tensile strength, flexible material. Lanyard 180 has a body 182 having a predetermined length, and a first end 184 that terminates in, or is secured or sewn to, a quick release fastener 186 such as a carabineer or the equivalent. Lanyard 180 also includes a second end 188 that terminates in, or is secured to, a fastener 190, such as a D-ring or an equivalent ring. Fastener 190 may be secured to loop 148 of bungee 140 as best depicted in FIG. 7B, so that elastic bungee 140 places tension on lanyard 180, thereby pulling second end 188 of lanyard 180 towards belt body 110 fastener 116. This feature of the invention ensures that lanyard 180 is retracted along belt body 110 as far as possible when not in use, as will be described further herein below.

In some embodiments lanyard body 182 may be secured to quick release fastener 186 and D-ring 190 by looping lanyard body 182 through fastener 186 and/or ring 190 and sewing the first and second ends 184, 188 to the lanyard body 182. In certain embodiments a wedge piece 194 may be sewn or otherwise secured to the first and second ends 184, 188 of lanyard body 182 to provide a slightly thicker and stiffer area proximate ends 184, 188 of lanyard 180. Wedge piece 194 may comprise an additional piece of webbing material or can be formed of carbon fiber material in some embodiments.

Referring again to FIGS. 5, 6, and 8, and in accordance with some aspects and embodiments a stop block 200 is provided, formed of a relatively stiff, high strength material such as carbon fiber, aluminum, or any of a wide variety metals or high strength plastics. Stop block 200 may include a belt slot 202 and a lanyard slot 204, through which lanyard body 182 passes. Belt slot 202 may be sized to accommodate a length or portion of webbing 210 or equivalent material that is passed through belt slot 202 and then secured at either end thereof to belt body 110, thereby securing lanyard block 200 to belt body 110. In some embodiments stop block 200 is secured to belt body 110 proximate first end 112 and buckle 120. Additionally, stop block 200 may include a base portion 206 that contacts and rests on belt body 110. Base portion may be sized to be substantially the same width as belt body 100 and have a length that is sufficient to distribute the force placed upon stop block 200 by a user 1 being tethered to lanyard 8 across a predetermined area of belt body 110.

In some exemplary embodiments lanyard slot 204 is sized to enable lanyard body 182 to easily and smoothly pass through slot 204, while ends 184, 188 and concomitant wedge portions 194 fit snugly into slot 204, thereby stopping lanyard 180 from passing through lanyard slot 204 at either end. In some embodiments quick release fastener 186 and D-ring fastener 190 may abut slot 204 to prevent lanyard 180 from passing through, thereby capturing lanyard 180 in lanyard block 200.

In operation, bungee 140 is secured to belt body 110 by fastener 144, and is routed through bungee guide 150. Bungee 140 is then secured to lanyard 180 second end 188 by loop 148 fastening to D-ring fastener 190. In this embodiment bungee 140 pulls or biases second end 188 of lanyard body 182 toward fastener 144, thereby holding lanyard 180 quick release fastener 186 near stop block 200 until the user 1 needs to fasten it to an object. In some embodiments lanyard body 182 has a predetermined length that is sized to enable lanyard body 182 to be substantially coextensive with belt body 110 until a user 1 pulls lanyard 180 outwardly, away from stop block 200.

When a user 1 wears belt 100, quick release fastener 186 may be grasped and clipped onto a ring or portion of an object not shown) to which the user chooses to be tethered. Lanyard 180 may be pulled out through stop block 200 until second end 188, including wedge portion 194 engages lanyard slot 204 and lanyard 180 is prevented from extending any further. As can be readily seen, stop block 200, belt body 110, and lanyard 180 bear all the force or weight of a user 1 when fully extended, while bungee 140 simply biases lanyard 180 back toward a center of belt body 110 once tension on lanyard 180 is released.

As best depicted in FIGS. 5 and 6 and in accordance with some embodiments a pair of leg loop buckles 210 may be provided, each leg loop buckle 210 having a loop 212 that may be engaged by belt body 110 so that loops 212 may be positioned at any point along belt body 110. Leg loop buckles 210 may further include a quick release fastener 214. Additionally, a leg loop harness 220 is provided, having a pair of adjustable leg loops 222 connected by a central strap 224, each of said leg loops 222 also including a quick release fastener 226 secured thereto that is shaped to engage quick release fastener 214 of leg loop buckles 210. This embodiment permits a user 1 to put each leg through a leg loop 222 and position the loop buckles 210 along belt body 110 to provide an extra measure of support when wearing belt 100.

Figure 9:
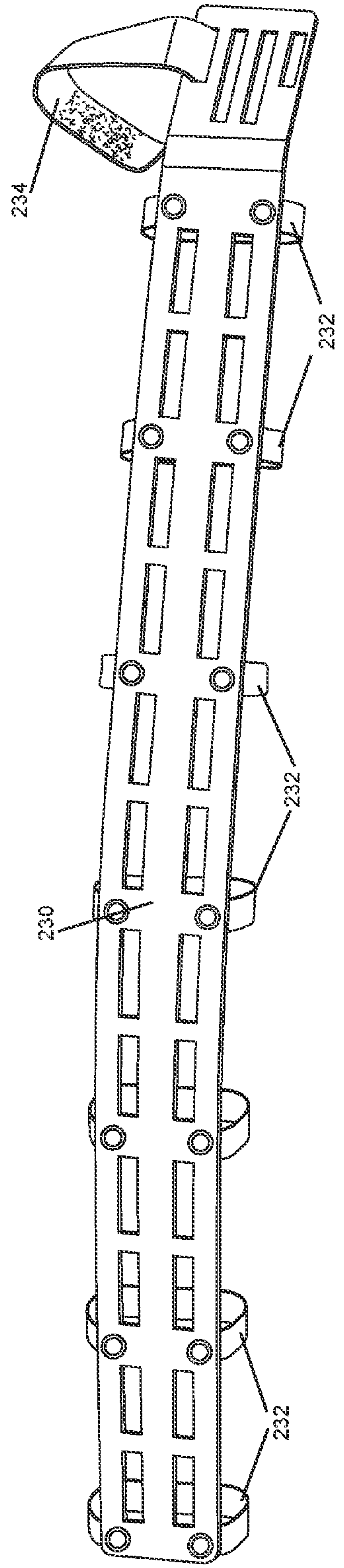
FIG. 9 is a view of a belt cage in accordance with some embodiments.

Referring now to FIGS. 5, 6 and 9, and in accordance with some exemplary embodiments, a flexible cage 230 is also provided that is positioned on the exterior of belt body 110 to protect bungee 140 and lanyard 180 from entanglement and damage while belt 100 is being worn. Cage 230 is formed of a flexible plastic material, or the equivalent thereof, and is fitted with a plurality of belt loops for positioning cage around belt body 110. Cage 230 may also have a hook and loop fastener secured at an end thereof, for securely fastening cage 230 around belt body 110. An inner belt 240 may also be provided for wearing underneath belt 100. Inner belt 240 may include a porition of hook and loop fastener material 242 and a d-ring or belt ring 244 for securing the belt around user 1. Inner belt 240 material 242 may engage corresponding material provided on an interior portion of belt 100, thereby providing for a secure fit of belt 100 around user 1. This embodiment is particularly useful when a wearer or user 1 falls and is restrained by belt 100 lanyard 180.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms “connected,” “coupled,” “in communication with,” “secured,” and “mounted,” and variations thereof herein are used broadly and encompass direct and indirect connections, couplings, and mountings. In addition, the terms “secured” and “mounted” and variations thereof are not restricted to physical or mechanical connections or couplings.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. A belt for securing a user to an object comprising:

a belt body having a first end and a second end;

a belt buckle secured to the first end of said belt body, and said second end of said belt body passing through said belt buckle and secured thereto to form a belt;

an elastic bungee having a first end detachably secured to said belt between said first and second ends thereof, said bungee passing through a bungee guide secured to said belt, and said bungee having a second end terminating in fastener;

a lanyard having a body, a first end terminating in a quick release fastener and a second end terminating in a fastener that is connected to said bungee fastener thereby securing said lanyard to said bungee; and a stop block having a lanyard slot through which said lanyard body passes such that, when fully extended away from said belt, said lanyard second end fastener abuts said block at said lanyard slot to prevent said lanyard from further extension.

2. The belt of claim 1 comprising:

the stop block having a base portion having a width that is substantially identical to a width of said belt body.

3. The belt of claim 1 comprising:

a flexible cage removably secured around said belt body for protecting said lanyard and said bungee from entanglement.

4. The belt of claim 1, wherein the lanyard quick release fastener is a carabineer.

5. The belt of claim 1, wherein the lanyard second end fastener is a D-ring.

6. The belt of claim 1 further comprising:

said stop block having an belt slot therein; and a length of webbing material having first and second ends, said webbing material extending through said belt slot and sewn to said belt at said webbing first and second ends for securing said block to said belt body.

7. The belt of claim 1, wherein the bungee first end is secured to said belt with a snap and said bungee second end fastener is a girth hitch attachment, wherein said bungee is replaceable.

8. The belt of claim 1 wherein said lanyard has a predetermined length and retracts until said quick release fastener abuts said lanyard slot.

9. The belt of claim 1 wherein said lanyard first and second ends each include a wedge portion secured thereto, thereby enhancing the thickness of said first and second ends to prevent them from passing through said lanyard slot.

* * * * *